(12) United States Patent
Ghisoni et al.

(10) Patent No.: US 7,699,396 B2
(45) Date of Patent: Apr. 20, 2010

(54) SEAT ASSEMBLY HAVING AN INTERNAL MOUNTING BRACKET AND A SEAT COVER INCLUDING A CLOSURE STRUCTURE

(75) Inventors: Giuseppe Ghisoni, Milan (IT); Giorgio Ursino, Turin (IT)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/656,611

(22) Filed: Jan. 23, 2007

(65) Prior Publication Data

US 2008/0174158 A1 Jul. 24, 2008

(51) Int. Cl.
*B60N 2/28* (2006.01)
(52) U.S. Cl. .................................. 297/253; 297/188.2
(58) Field of Classification Search ............... 297/253, 297/481, 250.1, 188.2
See application file for complete search history.

(56) References Cited

U.S. PATENT DOCUMENTS

| | | | | |
|---|---|---|---|---|
| 2,294,039 A * | 8/1942 | Looney | ............... | 297/188.07 |
| 3,576,346 A * | 4/1971 | Hutchinson | ............... | 297/481 |
| 4,047,756 A * | 9/1977 | Ney | ............... | 297/219.1 |
| 4,385,783 A * | 5/1983 | Stephens | ............... | 297/452.55 |
| 4,540,216 A * | 9/1985 | Hassel, Sr. | ............... | 297/238 |
| 4,596,420 A * | 6/1986 | Vaidya | ............... | 297/233 |
| 4,756,573 A * | 7/1988 | Simin et al. | ............... | 297/250.1 |
| 4,815,789 A * | 3/1989 | Marcus | ............... | 297/440.22 |
| 4,943,112 A * | 7/1990 | Law | ............... | 297/238 |
| 5,139,311 A * | 8/1992 | Imai et al. | ............... | 297/481 |
| 5,161,855 A * | 11/1992 | Harmon | ............... | 297/238 |
| 5,281,002 A * | 1/1994 | Dauphin | ............... | 297/452.38 |
| 5,362,127 A * | 11/1994 | Chang | ............... | 297/195.1 |
| 5,476,305 A * | 12/1995 | Corkins et al. | ............... | 297/238 |
| 5,560,683 A * | 10/1996 | Penley et al. | ............... | 297/452.56 |
| 5,568,959 A * | 10/1996 | Weber et al. | ............... | 297/238 |
| 5,918,934 A | 7/1999 | Siegrist | | |
| 6,267,442 B1 * | 7/2001 | Shiino et al. | ............... | 297/254 |
| 6,322,141 B1 | 11/2001 | Dutkievic et al. | | |
| 6,416,128 B1 | 7/2002 | Fujii | | |
| 6,582,016 B1 | 6/2003 | Kirchoff et al. | | |
| 6,601,917 B1 * | 8/2003 | Christopherson | ............... | 297/253 |
| 7,281,763 B1 * | 10/2007 | Hayashi et al. | ............... | 297/253 |

* cited by examiner

*Primary Examiner*—Peter R. Brown
(74) *Attorney, Agent, or Firm*—MacMillan, Sobanski & Todd, LLC

(57) ABSTRACT

This invention relates to an improved cover for a seat assembly that includes a closure structure for selectively providing access to an internal mounting bracket and that has an aesthetically pleasing appearance. The seat assembly includes a seat portion and a back portion that cooperate to provide a seat. At least one of the seat portion and the back portion includes a frame having a mounting bracket provided thereon and a cover having an opening. A closure structure is provided on the cover for selectively providing access though the opening formed through the cover to the mounting bracket. The closure structure may be embodied as any releasable closure structure, including a zipper, hook and loop material, snap fasteners, buttons, and the like.

14 Claims, 3 Drawing Sheets

SEAT ASSEMBLY HAVING AN INTERNAL MOUNTING BRACKET AND A SEAT COVER INCLUDING A CLOSURE STRUCTURE

BACKGROUND OF THE INVENTION

This invention relates in general to a seat assembly having an internal mounting bracket that is adapted to be selectively engaged by an external device, such as a child car seat. In particular, this invention relates to an improved cover for such a seat assembly that includes a closure structure for selectively providing access to the internal mounting bracket and having an aesthetically pleasing appearance.

Seat assemblies are well known in the art and are widely used in a variety of applications, such as vehicles, for supporting persons thereon. A typical seat assembly includes a generally horizontally extending seat portion and a generally vertically extending back portion. Usually, each of the seat and back portions is formed from a plurality of frame members connected together to provide respective rigid seat and back frames. A cushioning material is provided about each of the seat and back frames to provide a comfortable feel for a person sitting on the seat assembly. The cushioning material is, in turn, covered by a seat cover to protect the cushioning material and to provide an aesthetically pleasing appearance.

In many modern vehicles, either or both of the seat frame and the back frame may be additionally provided with one or more internal mounting brackets to facilitate the securement of an external device, such as a child car seat, to the seat assembly. A variety of such internal mounting brackets are known in the art. For example, the International Organization of Standardization has developed and published a standard system for the securement of a child car seat to a vehicle seat assembly that is commonly referred to as the ISOFIX system. Generally speaking, the ISOFIX system includes a pair of internal mounting brackets having predetermined sizes and shapes that are secured to the seat frame in predetermined positions relative to one another. The internal mounting brackets of the ISOFIX system are adapted to cooperate with correspondingly shaped and positioned latches that are provided on a child car seat or other device to quickly and reliably secure the child car seat to the vehicle seat assembly.

In order to facilitate quick and reliable access to the internal mounting brackets provided within a vehicle seat assembly, it is known to provide openings through the seat cover and the cushioning material. However, such openings have been found to provide a less than aesthetically pleasing appearance when the external device is not secured to the vehicle seat assembly. Thus, it would be desirable to provide an improved cover for such a seat assembly that includes a closure structure for selectively providing access to the internal mounting bracket and that has an aesthetically pleasing appearance.

SUMMARY OF THE INVENTION

This invention relates to an improved cover for a seat assembly that includes a closure structure for selectively providing access to an internal mounting bracket and that has an aesthetically pleasing appearance. The seat assembly includes a seat portion and a back portion that cooperate to provide a seat. At least one of the seat portion and the back portion includes a frame having a mounting bracket provided thereon and a cover having an opening. A closure structure is provided on the cover for selectively providing access though the opening formed through the cover to the mounting bracket. The closure structure may be embodied as any releasable closure structure, including a zipper, hook and loop material, snap fasteners, buttons, and the like.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
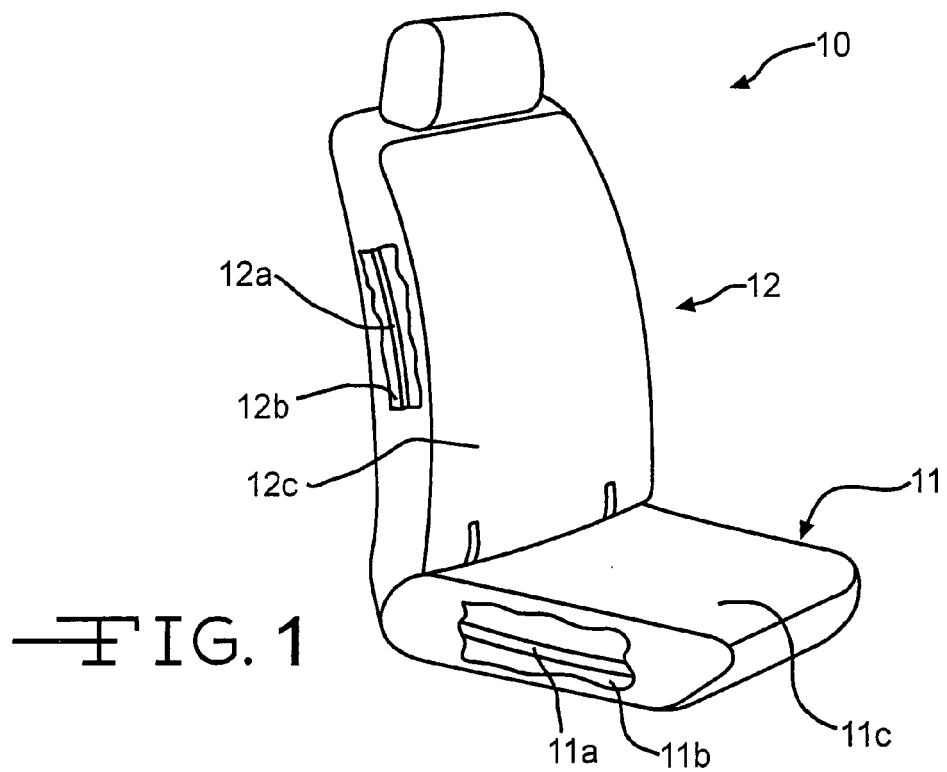
FIG. 1 is a perspective view, partially broken away, of a seat assembly having an internal mounting bracket and a seat cover including a closure structure in accordance with this invention.
Figure 2:
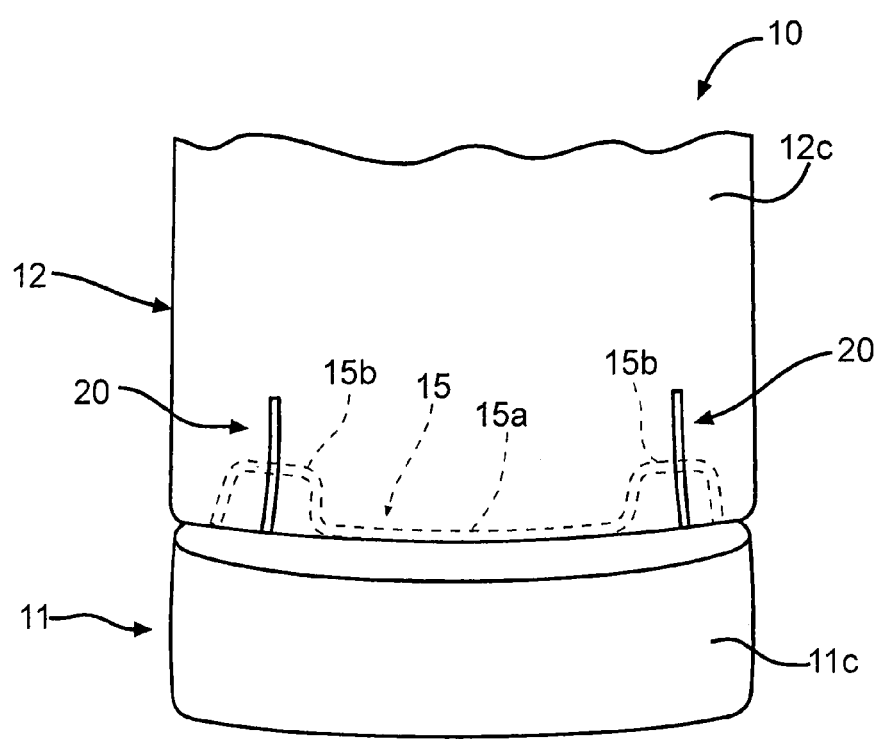
FIG. 2 is an enlarged front elevational view of a portion of the seat assembly illustrated in FIG. 1.

Referring now to the drawings, there is illustrated in FIGS. 1 and 2 a seat assembly, indicated generally at 10, in accordance with this invention. The illustrated seat assembly 10 is a vehicle seat assembly that is, in large measure, conventional in the art and is intended merely to illustrate one environment in which this invention may be used. Thus, the scope of this invention is not intended to be limited for use with the specific structure for the seat assembly 10 illustrated in FIG. 1 or with vehicle seat assemblies in general. On the contrary, as will become apparent below, this invention may be used in any desired environment for the purposes described below.

The illustrated seat assembly 10 includes a generally horizontally extending seat portion, indicated generally at 11, and a generally vertically extending back portion, indicated generally at 12, that cooperate to provide a seat. As is well known in the art, the seat portion 11 is formed from one or more seat frame members that are connected together to provide a rigid seat frame 11a for the seat portion 11. A seat cushioning material 11b is provided about the seat frame 11a to provide a comfortable feel for a person sitting on the seat assembly 10. The seat cushioning material 11b is, in turn, covered by a seat cover 11c to protect the seat cushioning material 11b and to provide an aesthetically pleasing appearance. Similarly, the back portion 12 is formed from one or more back frame members that are connected together to provide a rigid back frame 12a for the back portion 12. A cushioning material 12b is provided about the back frame 12a to provide a comfortable feel for a person leaning back on the seat assembly 10. The back cushioning material 12b is, in turn, covered by a back cover 12c to protect the back cushioning material 12b and to provide an aesthetically pleasing appearance.

Figure 3:
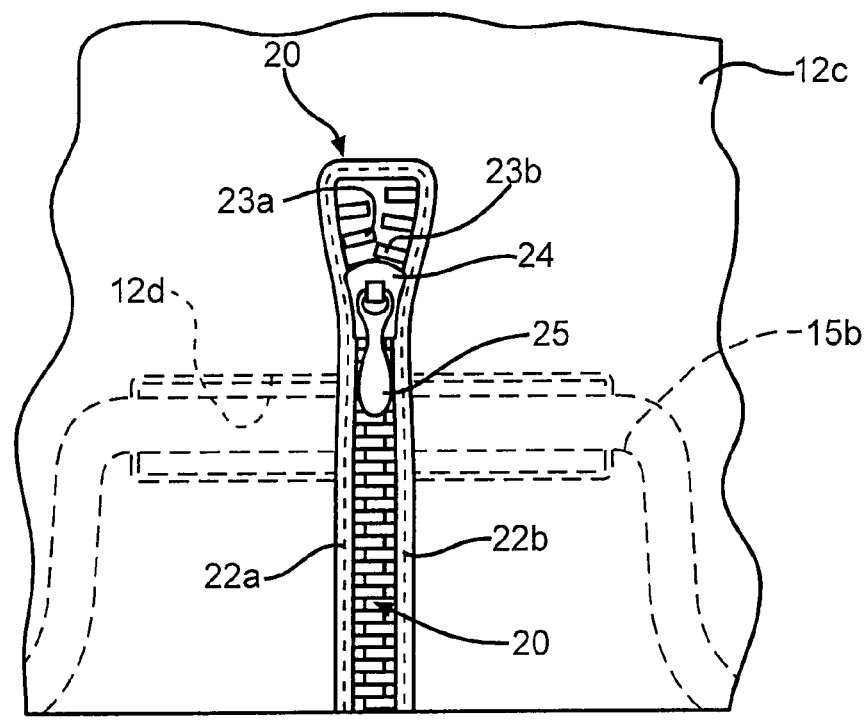
FIG. 3 is a further enlarged front elevational view of one of the closure structures of the seat assembly illustrated in FIG. 2, wherein the closure structure is shown in a closed position to conceal an internal mounting bracket.
Figure 4:
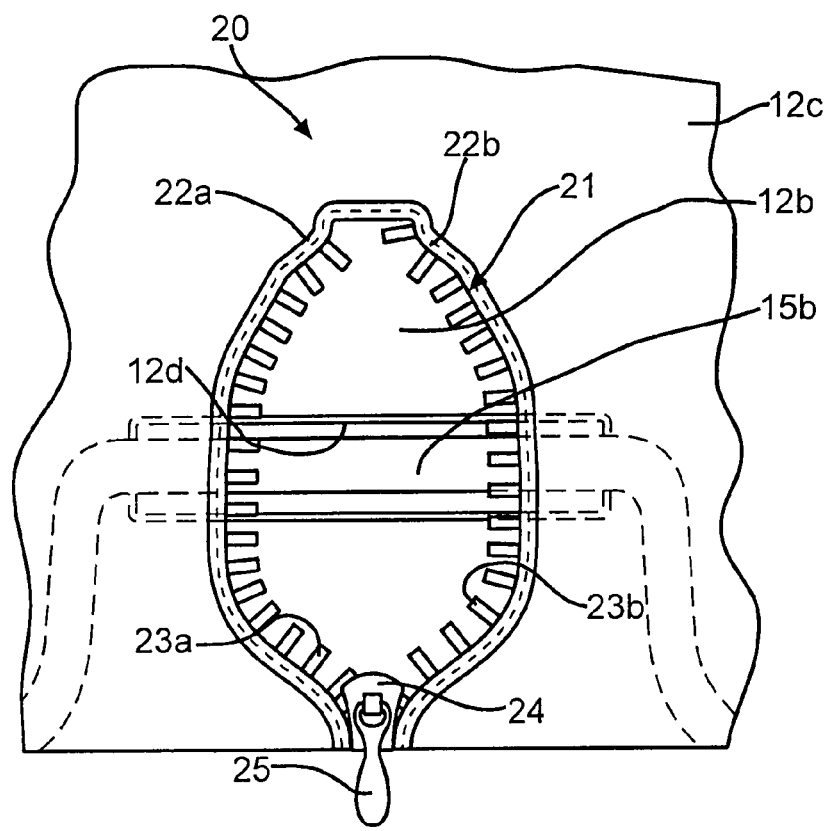
FIG. 4 is an enlarged front elevational view similar to FIG. 3 showing the closure structure in an opened position to provide access to the internal mounting bracket.

The seat assembly 10 also includes an internal mounting bracket, indicated generally at 15 in FIGS. 2, 3, and 4, to facilitate the securement of an external device (not shown) thereto, such as a child car seat. The internal mounting bracket 15 is conventional in the art and can be secured to either or both of the seat frame 11a and the back frame 12a to provide stable support for the external device to be secured thereto. As shown in FIG. 2, the illustrated internal mounting bracket 15 includes a central portion 15a that extends between first and second connection portions 15b. Each of the illustrated connection portions 15b is formed generally in the shape of an inverted-U, although such is not required. As shown in FIGS. 3 and 4, some or all of the internal mounting bracket 15 may be received within recesses 12d formed in the cushioning material 12b of the back portion 12 of the seat assembly 10, although such is not required.

The internal mounting bracket 15 may be connected to the seat assembly 10 in any desired manner to provide stable support for the external device to be secured thereto. For example, the internal mounting bracket 15 may be mechanically connected to the seat frame 11a or to the back frame 12b. In such an arrangement, the internal mounting bracket 15 may either be fixed in position relative to the seat frame 11a and back frame 12b or may be movable relative thereto (pivotably connected, for example). Alternatively, the internal mounting bracket 15 may be directly welded to the seat frame 11a or to the back frame 12a. A variety of such internal mounting brackets 15 are known in the art, and this invention is not intended to be limited by the specific structure for the internal bracket 15.

The seat assembly 10 further includes a closure structure, indicated generally at 20, that selectively provides access to the internal mounting bracket 15. In the illustrated embodiment, two of such closure structures 20 are provided in the back cover 12c of the seat assembly 10 for selectively providing access to each of the connection portions 15b of the internal mounting bracket 15. However, it will be appreciated that the closure structures 20 may be provided in the seat cover 11c of the seat assembly 10 for selectively providing access to each of the connection portions 15b of the internal mounting bracket 15.

The structure of one of the closure structures 20 is illustrated in detail in FIGS. 3 and 4. As shown therein, the closure structure 20 includes a zipper, indicated generally at 21, that is provided in the back cover 12c of the seat assembly 10. The zipper 21 is conventional in the art and includes first and second strips of fabric 22a and 22b that are respectively connected, such as by sewing, to the adjacent sides of a slit-like opening formed through the back cover 12c. A first plurality of shaped teeth 23a is secured to the first strip of fabric 22a, while a second plurality of shaped teeth 23a is secured to the second strip of fabric 22b. A slider 24 is provided for selectively causing the first and second pluralities of teeth 23a and 23b to engage one another. To accomplish this, the slider 24 includes an internal Y-shaped channel (not shown) that receives the first and second pluralities of teeth 23a and 23b. When the slider 24 is moved to a first position (such as the upward position illustrated in FIG. 3), the first and second pluralities of teeth 23a and 23b are caused to engage one another. As a result, the slit-like opening formed through the back cover 12c is closed, and access to the internal mounting bracket 15 is prevented. When the slider 24 is moved to a second position (such as the downward position illustrated in FIG. 4), the first and second pluralities of teeth 23a and 23b are caused to disengage from one another. As a result, the slit-like opening formed through the back cover 12c is opened, and access to the internal mounting bracket 15 is allowed. If desired, a hand clasp 25 may be connected to the slider 24 to facilitate the movement thereof. Also, it will be appreciated that the first and second positions of the slider 24 may be the opposite from what is illustrated (i.e., the first position is the downward position illustrated in FIG. 4 and the second position is the upward position illustrated in FIG. 3).

During normal use of the seat assembly 10, no external device (such as a child car seat) is connected to the internal mounting bracket 15. Thus, access through the back cover 12c to the internal mounting bracket 15 is neither necessary nor desirable. In order to protectively cover the cushioning material 12b provided about the back frame, the zipper 21 of the closure structure 20 is moved to the upward position illustrated in FIG. 3. Such movement causes the slit-like opening formed through the back cover 12c to be closed in the manner described above. Consequently, the seat assembly 10 can be used in a normal manner, and aesthetically pleasing appearance is provided.

However, when it is desired to connect an external device, such as a child car seat, to the seat assembly 10, access to the internal mounting bracket 15 through the back cover 12c is necessary. To accomplish this, the zipper 21 of the closure structure 20 is moved to the downward position illustrated in FIG. 4. Such movement causes the slit-like opening formed through the back cover 12c to be opened in the manner described above. Consequently, a locking arm (not shown) of an external device can be inserted through the slit-like opening formed through the back cover 12c into engagement with the internal mounting bracket 15 in a known manner.

It will be appreciated that this invention is not intended to be limited to the illustrated zipper 21 for the closure structure 20. Rather, this invention contemplates that the closure structure 20 may be embodied as any known releasable closure structure that can selectively provide access though the opening formed through the back cover 12c to the internal mounting bracket 15. For example, the closure structure 20 may be embodied as any other releasable closure apparatus, such as hook and loop material, snap fasteners, buttons, and the like.

Figure 5:
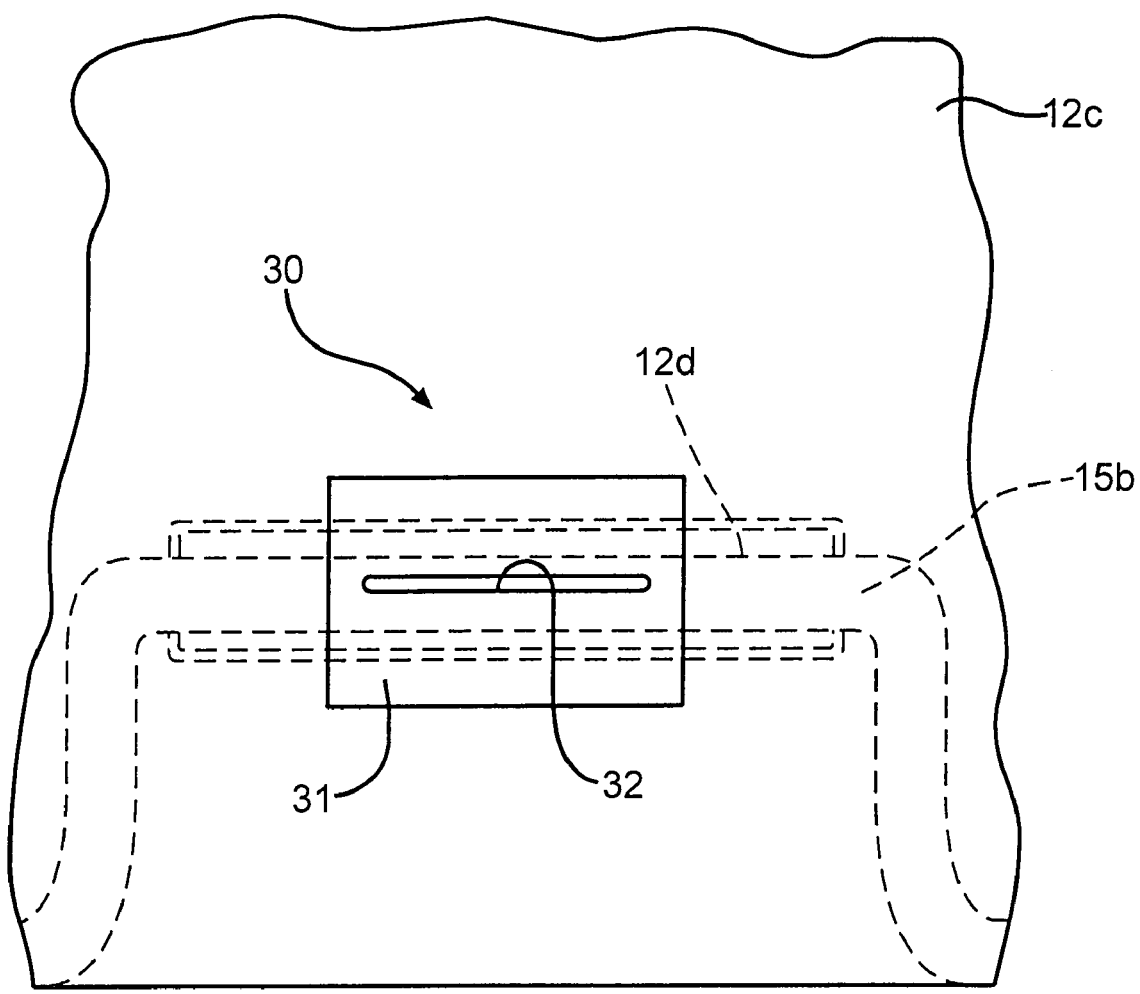
FIG. 5 is an enlarged front elevational view of a portion of a conventional seat assembly including a seat cover having a known access structure formed therethrough to provide access to an internal mounting bracket.

FIG. 5 illustrates a known access structure, indicated generally at 30, that has been used in the past with the seat assembly 10. The known access structure 30 includes a patch of material 31 that is secured, such as by sewing, to the back cover 12c of the seat assembly 10 about an opening formed therethrough. The patch of material 31 has a slit-like opening 32 formed therethrough that is aligned with the opening formed through the back cover 12c of the seat assembly 10. The known access structure 30 thus provides access though the opening 32 formed through the patch of material 31 and through the opening formed through the back cover 12c to the internal mounting bracket 15.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat assembly comprising:
    a seat portion and a back portion, wherein at least one of the seat portion and the back portion includes:
    a frame;
    a mounting bracket provided on the frame and adapted to have a child car seat selectively secured thereto and released therefrom;
    a cushioning material supported on the frame and extending about the mounting bracket;
    a cover covering the cushioning material and having an opening formed therethrough; and
    a closure structure provided on the cover that which selectively permits attachment of the child car seat through the opening formed through the cover to the mounting bracket such that when the closure structure closes the opening, attachment of the child car seat to the mounting bracket is prevented.

2. The seat assembly defined in claim 1 wherein the mounting bracket is received within a recess formed in the cushioning material.

3. The seat assembly defined in claim 1 wherein the closure structure is a releasable closure structure.

4. The seat assembly defined in claim 3 wherein the closure structure includes one of a zipper, a hook and loop material, a snap fastener, and a button.

5. The seat assembly defined in claim 1 wherein the cover has first and second sides that define a slit-like opening.

6. The seat assembly defined in claim 5 wherein the closure structure has a first portion that is connected to the first side of the cover and a second portion that is connected to the second side of the cover, and wherein the first and second portions of the closure structure selectively engage one another to selectively provide access through the opening formed through the cover.

7. The seat assembly defined in claim 1 wherein the cover has first and second sides that are elongated and extend adjacent to one another to define a slit-like opening.

8. A combined seat and child car seat assembly comprising:
a seat portion and a back portion, wherein at least one of the seat portion and the back portion includes:
a frame;
a mounting bracket provided on the frame;
a cushioning material supported on the frame and extending about the mounting bracket;
a cover covering the cushioning material and having an opening formed therethrough;
a closure structure provided on the cover which selectively permits attachment of the child car seat through the opening formed through the cover to the mounting bracket when in an opened position and for preventing access through the opening formed through the cover to the mounting bracket when in a closed position; and
a child car seat supported on the seat portion and having a locking part that is secured to the mounting bracket when the closure structure is in the opened position.

9. The combined seat and child car seat assembly defined in claim 8 wherein the mounting bracket is received within a recess formed in the cushioning material.

10. The combined seat and child car seat assembly defined in claim 8 wherein the closure structure is a releasable closure structure.

11. The combined seat and child car seat assembly defined in claim 10 wherein the closure structure includes one of a zipper, a hook and loop material, a snap fastener, and a button.

12. The seat assembly defined in claim 8 wherein the cover has first and second sides that define a slit-like opening.

13. The seat assembly defined in claim 12 wherein the closure structure has a first portion that is connected to the first side of the cover and a second portion that is connected to the second side of the cover, and wherein the first and second portions of the closure structure selectively engage one another to selectively provide access through the opening formed through the cover.

14. The seat assembly defined in claim 8 wherein the cover has first and second sides that are elongated and extend adjacent to one another to define a slit-like opening.

* * * * *